July 14, 1931. A. M. NIVEN 1,814,764
SLEEVE VALVE AND METHOD OF MAKING SAME
Filed July 15, 1927 3 Sheets-Sheet 1
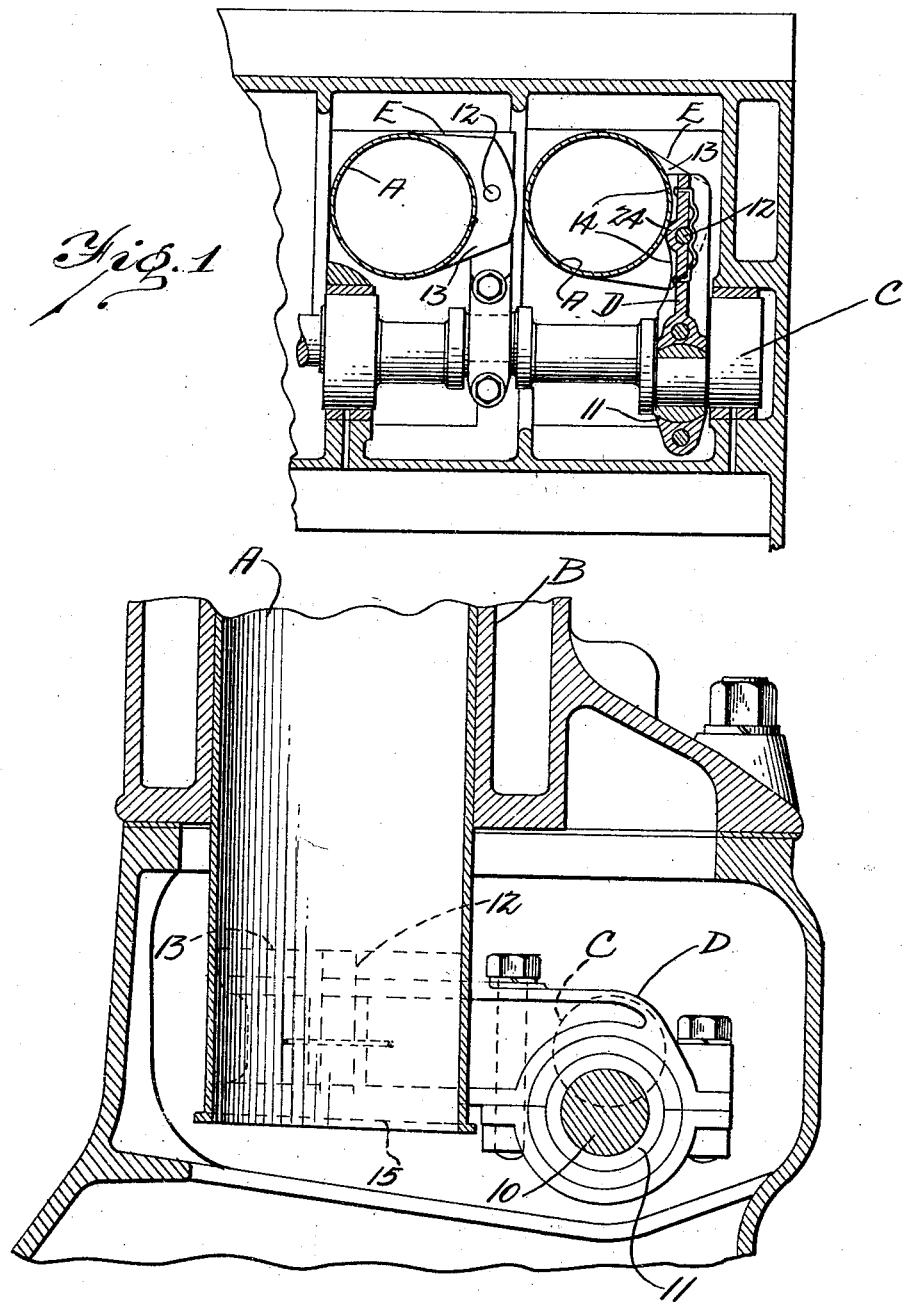
INVENTOR.
Archie Macphail Niven
BY W. W. Harries
ATTORNEY.

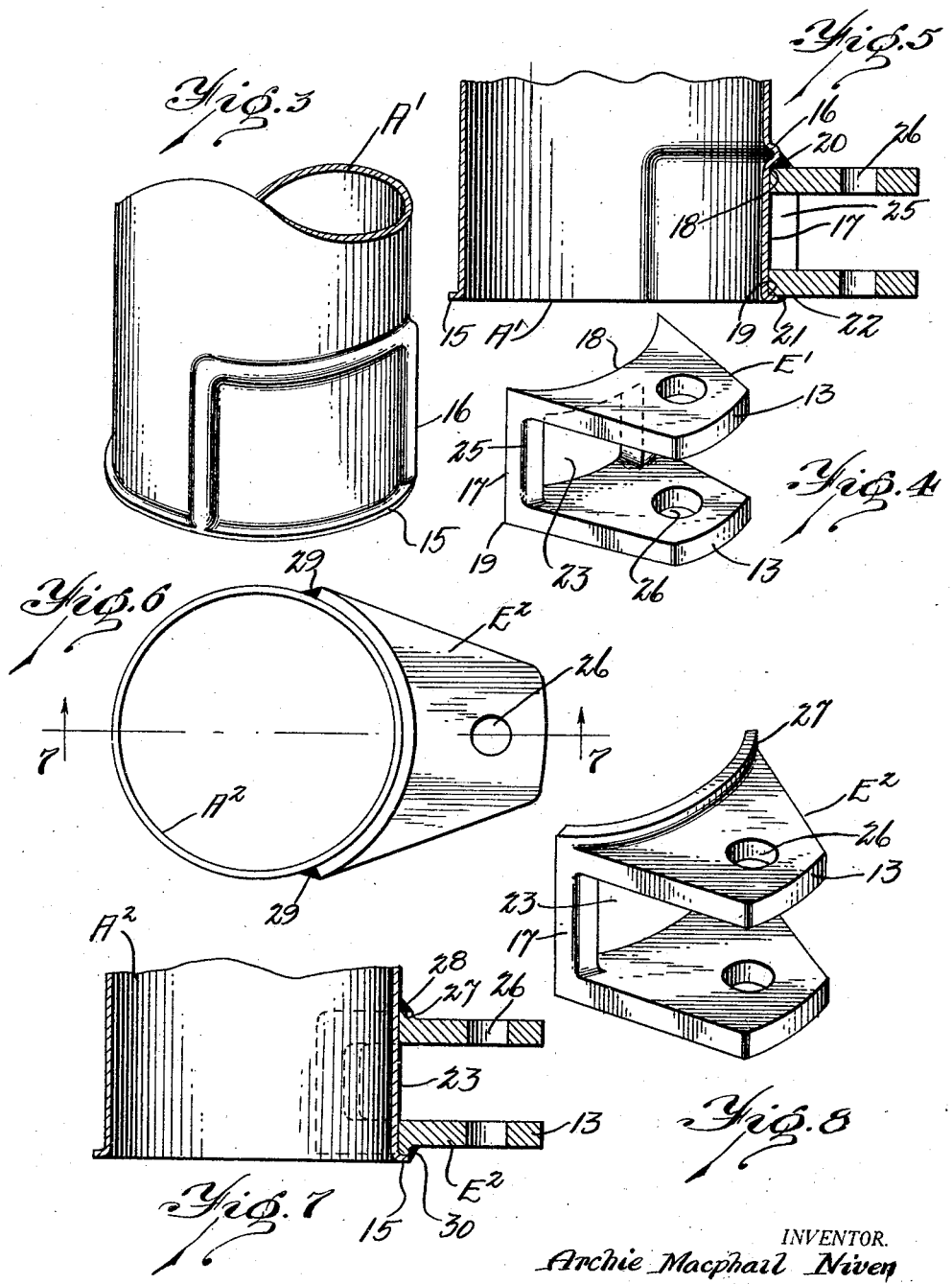

July 14, 1931.  A. M. NIVEN  1,814,764
SLEEVE VALVE AND METHOD OF MAKING SAME
Filed July 15, 1927  3 Sheets-Sheet 3
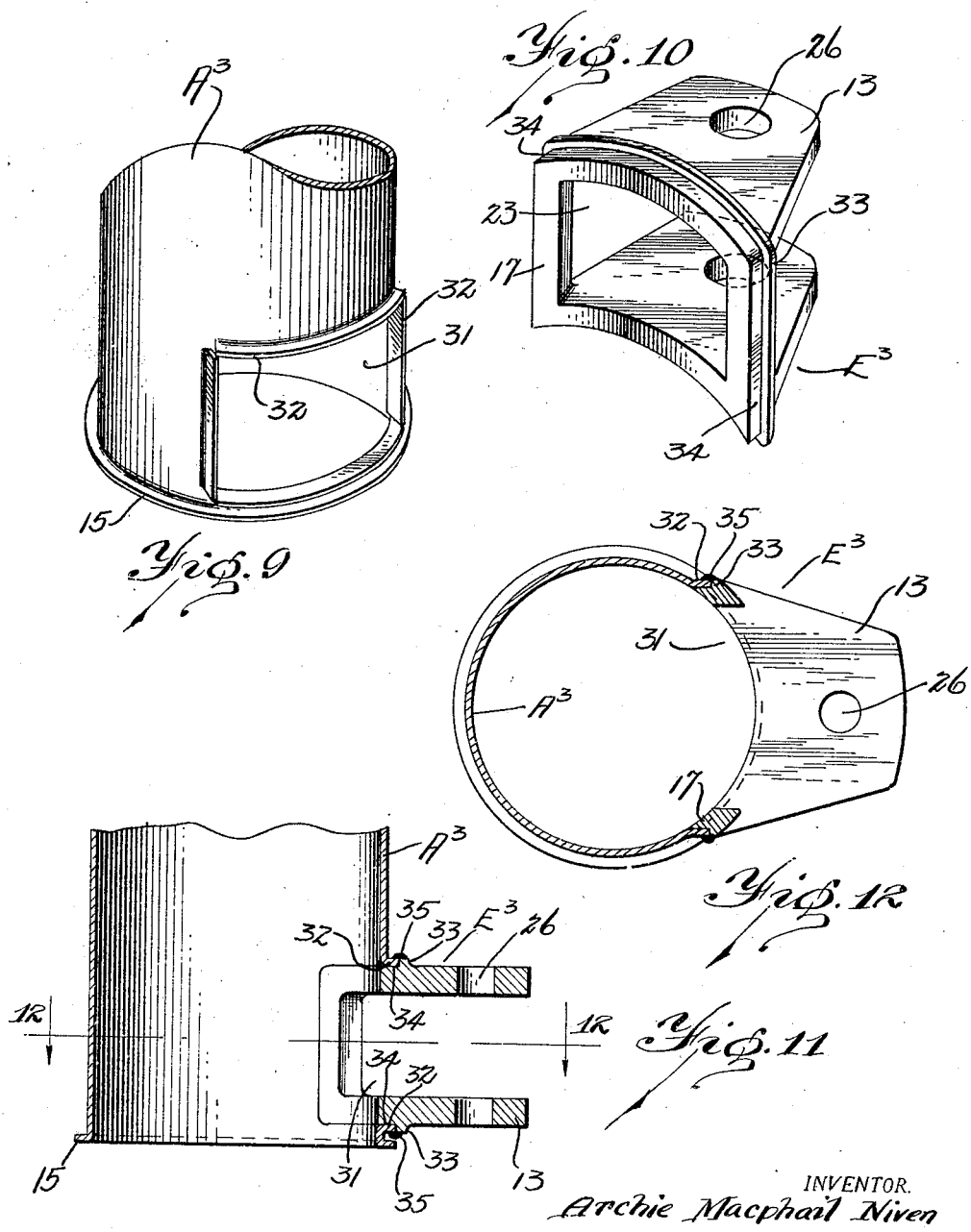
INVENTOR.
Archie Macphail Niven
BY
W. W. Harris
ATTORNEY.

Patented July 14, 1931

1,814,764

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE AND METHOD OF MAKING SAME

Application filed July 15, 1927. Serial No. 205,973.

This invention relates to internal combustion engines and refers more particularly to an improved sleeve valve and method of making same. My invention relates primarily to the single sleeve valve engine and particularly, though not necessarily so limited to the type where the sleeve is moved in a combined reciprocating and oscillating path with respect to the sleeve and cylinder axis whereby the sleeve and cylinder ports are caused to function in the well known manner.

Heretofore such sleeve valves have been generally made of cast iron, especially where the valves are driven by a link mechanism operated by a valve layshaft. Steel sleeves or sleeves constructed of materials having the general characteristics of steel as distinguished from cast iron have been used in many types of sleeve valve engines and my invention embodies an improved construction and method of manufacture for this type of sleeve valve. It is known that steel sleeves may be made much lighter than cast iron sleeves thus reducing the inertia forces incident to operating the engine. Difficulty has been experienced, however, in suitably and conveniently securing the driving lug or other sleeve driving means to the steel sleeve valve. Such a problem does not arise in the use of cast iron sleeves since such lugs or driving means may be cast integrally with the sleeves. A further difficulty experienced in connection with the use of steel sleeves resides in conveniently reinforcing the lower end of the sleeve. The steel sleeve due to its thinness is generally reinforced to prevent undue twisting and distortion. Here, again, where such reinforcing is desirable in a cast iron sleeve, a reinforcing annular band or bands may be conveniently cast with the sleeve.

I have provided means whereby a steel sleeve valve may be conveniently and cheaply manufactured, overcoming the difficulties experienced in the past.

With the foregoing and other objects in view my invention resides in the novel combination and arrangement of parts more particularly hereinafter described and claimed.

Referring to the accompanying drawings in which like reference characters indicate corresponding parts throughout the several views, Fig. 1 is a plan view in cross section of a portion of an engine showing the sleeve valves and driving means therefor, Fig. 2 is a sectional elevation through a typical sleeve valve, Fig. 3 is a perspective view of the lower end of a sleeve valve showing the sleeve prepared to receive the driving lug, Fig. 4 is a perspective view showing the driving lug, Fig. 5 is a sectional elevation through the assembled sleeve and driving lug, Fig. 6 is a plan view of a form of lug and sleeve assembly, Fig. 7 is a detail sectional view through 7—7 of Fig. 6, Fig. 8 is a perspective view of the lug shown in Figs. 6 and 7, Fig. 9 is a view corresponding to Fig. 3 showing a still further modification, Fig. 10 is a perspective view of the sleeve lug shown in Fig. 9, Fig. 11 is a sectional elevation view through the assembled sleeve and lug of Figs. 9 and 10, and Fig. 12 is a sectional view through 12—12 of Fig. 11.

In the drawings reference character A represents the sleeve valves operable within cylinders B, the sleeves and cylinders having the usual ports (not shown) for controlling the cyclic events of the engine. The sleeves may be driven in various manners, that shown comprising the valve layshaft C having cranks 10 which may operate the links D through a ball and socket connection 11 to permit the slight side swing of the links. The links D may be constrained to move parallel to themselves by connection through a pivot pin 12 between the ears 13 of sleeve driving lug E and if desired the link face next to the sleeve may be recessed in arcs 14 conforming with the sleeve contour whereby the pivot pin 12 may be positioned closer than otherwise to the sleeve valve. Thus the sleeve valve is moved in a combined reciprocating and oscillating path, the usual piston (not shown) operating within each sleeve valve for each cylinder of the engine.

Referring particularly to Figs. 3, 4, and 5 the sleeve A' is constructed of relatively thin steel tubing or other suitable material affording the necessary strength and resistance to rupture and distortion. Such tubing may be drawn, rolled or prepared in any convenient manner. I then preferably spin or roll over the lower edge to form the annular flange 15 which will stiffen the lower portion of the sleeve and prevent its twisting and distortion. The rib 16 is pressed outwardly and may be located so as to receive therewithin the side edges 17 and top edge 18 of the driving lug E', the lower edge 19 thereof resting in the corner formed by the flange 15. The lug E' is then secured in position preferably by welding at 20 between the rib 16 and lug edges 17 and 18, and also at 21 between the flange 15 and adjacent lug face 22. The rib 16 affords an efficient welding connection with the faces of the lug E' it being well known that two materials will best weld when they are parallel, or substantially so, as distinguished from a right angular relative position. For the same reason the flange 15 offers a good welding connection and at the same time the rib 16 and flange 15 stiffens and strengthens the sleeve. The lug E' may be cut away at 23 to permit close positioning of the pivot pin 12 to the sleeve valve since otherwise the link pivot pin boss 24 would interfere with the driving lug rear wall requiring the pivot pin to be moved further away from the sleeve. Thus the lug E' is formed with the ears 13 connected by bridges 25, aligned openings 26 in the ears receiving the pivot pin 12. The lugs E' may be conveniently drop forged or stamped from sheet metal, and where the former method is employed the lugs may be forged in the form of an annular band with annular spaced flanges, and then segmentally cut to form the lugs as shown in Fig. 4.

In Figs. 6, 7, and 8 the sleeve A² is formed with the flange 15, the sleeve lug E² being provided with a flange 27 preferably substantially equal to the thickness of the sleeve, thus providing an efficient welding connection with the sleeve at 28. The weld may also be carried around the edges of the lug E² as at 29 and 30. The flange 27 being of substantially the same thickness of the sleeve valve and parallel thereto offers an efficient welding connection.

In Figs. 9 to 12 the sleeve A³ is formed with a punched out opening 31 having border outstanding flanges 32. The lug E³ is provided with a flange 33 preferably substantially equal to the sleeve thickness, this flange being spaced forwardly from the rear of the lug E³ to provide faces 34 for contact with the sleeve flange 32. Thus an efficient welding connection is provided around the sleeve flanges 32 and lug flanges 33 as at 35. If desired the lower flange 32 might be omitted and the lower lug flange 33 omitted, the lower ear 13 being positioned for welding adjacent the annular flange 15 as in Fig. 5.

Since the general practice in engines of the character described is to proportion the parts so that a portion of the piston leaves the lower end of the sleeve valve during a part of its travel, it is advisable to avoid sleeve deflected portions which might allow expansion of the piston rings into such deflected portions and the several illustrated embodiments of my invention will meet such requirements.

Various modifications will suggest themselves without departing from the spirit and scope of my invention and I do not limit myself to the precise constructions and methods illustrated except as recited in the claims.

What I claim as my invention is:

1. A tubular sleeve valve provided with a driving lug secured thereto, said lug provided with parallel ears integrally connected by spaced bridge portions.

2. A tubular sleeve valve formed with an opening bounded by integral flange portions extending outwardly from the sleeve, and a sleeve driving lug within the sleeve opening and formed with flanged portions welded to the said sleeve flange portions.

3. A tubular sleeve valve formed with an opening bounded by integral flange portions extending outwardly from the sleeve, and a sleeve driving lug within the sleeve opening and formed with flanged portions welded to the said sleeve flange portions, the said lug flanged portions being of substantially the same thickness as the sleeve flange portions.

4. A built-up tubular sleeve valve structure comprising a body portion, a sleeve valve actuating element having a portion thereof overlapped with respect to a portion of said body portion, and means for attaching said actuating element to the sleeve valve body portion, said actuating element provided with an ear having a flat bearing surface lying in a plane substantially at right angles with the sleeve valve axis.

5. A tubular sleeve valve formed with an opening and a flange bounding a portion of said opening, and a sleeve valve actuating element having a portion overlapping the flange and welded thereto.

6. A built-up tubular sleeve valve structure comprising a body portion, a sleeve valve actuating element having a portion thereof overlapped with respect to a portion of said body portion, and means for attaching said actuating element to the sleeve valve body portion, said actuating element provided with spaced flat bearing surfaces respectively lying in planes substantially at right angles with the sleeve valve axis.

7. A built-up tubular sleeve valve comprising a body portion, and a sleeve valve actuating element having a portion overlapped with respect to a portion of said body portion and welded thereto, said actuating element provided with an ear having a flat bearing surface lying in a plane substantially at right angles with the sleeve valve axis.

8. A built-up tubular sleeve valve comprising a body portion provided with an outwardly projecting integral rib, a sleeve valve actuating element having a portion adjacent said rib and welded thereto, said actuating element provided with an ear having a flat bearing surface lying in a plane substantially at right angles with the sleeve valve axis.

9. A tubular sleeve valve provided with an integral ribbed portion, a driving lug welded to said ribbed portion, said lug provided with parallel ears integrally connected by spaced bridge portions.

10. A tubular sleeve valve provided with an opening through the wall thereof, a driving lug within the opening and secured to the sleeve, said lug provided with parallel ears integrally connected by spaced bridge portions.

11. A tubular sleeve valve provided with an outwardly deflected portion, a driving lug having parallel ears integrally connected by spaced bridge portions, one of said ears having a flange extending axially of the sleeve and secure to the said outwardly deflected portion of the sleeve.

12. A tubular sleeve valve for internal combustion engines provided with an integral ribbed portion, and a sleeve lug having a portion overlapping said ribbed portion of the sleeve and welded thereto, said sleeve lug provided with means to the outside of said welded joint for supporting a pivoted connection with an actuating means.

13. A built up tubular sleeve valve structure comprising a body portion, and a sleeve valve actuating element secured thereto and having a portion thereof overlapped with respect to an exterior portion of said body portion.

14. A built up tubular sleeve valve structure comprising a body portion, a sleeve valve actuating element having a portion thereof overlapped with respect to an exterior portion of said body portion, and means for securing the overlapping portion of said sleeve valve actuating element to said body portion.

15. A built up tubular sleeve valve structure comprising a body portion provided with an outwardly deflected portion, a sleeve valve actuating element having a portion thereof overlapped with respect to the exterior surface of the deflected portion of said body portion, and means for securing the overlapping portion of said sleeve valve actuating element to said body portion.

16. A built up tubular sleeve valve structure comprising a body portion, and a sleeve valve actuating element having a portion thereof overlapped with respect to an exterior portion of said body portion and welded thereto.

17. A built up tubular sleeve valve structure comprising a body portion provided with a relatively shallow outwardly deflected portion, and a sleeve valve actuating element having a portion thereof overlapped with respect to an exterior surface of the shallow deflected portion of said body portion and welded thereto.

18. A tubular sleeve valve for internal combustion engines formed with an annular reinforcing flange, and a sleeve lug having a portion overlapping said flange and welded thereto.

19. A tubular sleeve valve for internal combustion engines formed with a relatively shallow reinforcing flange, and a sleeve lug having a portion overlapping said flange and welded thereto.

20. A tubular sleeve valve for internal combustion engines formed with an annular reinforcing flange portion and a second projecting portion, and a sleeve lug having a portion thereof overlapping said sleeve portions and welded thereto.

21. A tubular sleeve valve for internal combustion engines formed with parallel reinforcing projecting portions, and a sleeve lug having a portion thereof overlapping said sleeve portions and welded thereto.

22. A tubular sleeve valve for internal combustion engines formed with parallel annular reinforcing projecting portions lying in spaced parallel planes extending transversely of the sleeve axis, and a sleeve lug having a portion thereof overlapping said sleeve portions and welded thereto.

23. A tubular sleeve valve for internal combustion engines formed with projecting portions, and a sleeve lug positioned to project radially outwardly with respect to the wall of the sleeve and having an inner edge portion overlapping said sleeve portions and welded thereto.

24. A tubular sleeve valve for internal combustion engines formed with an annular reinforcing flange portion and other integral projecting portions, and a sleeve lug positioned to project radially outwardly with respect to the wall of the sleeve and having an inner edge portion overlapping said sleeve portions and welded thereto.

25. A tubular sleeve valve for internal combustion engines formed with a plurality of reinforcing flange portions projecting outwardly from the wall of the sleeve, and a sleeve lug positioned to project radially outwardly with respect to the wall of the sleeve and having an inner edge portion overlapping said sleeve flange portions and welded thereto.

26. A tubular sleeve valve for internal combustion engines formed with an outwardly extending annular projecting portion, and a sleeve lug comprising a pair of spaced ears and having at least one of said ears overlapping said projecting portion and welded thereto.

27. A tubular sleeve valve for internal combustion engines formed with spaced outwardly extending annular projecting portions, and a sleeve lug telescopically assembled within said projecting portions and comprising a pair of spaced ears projecting radially outwardly from the sleeve wall, said lug arranged to have an inner edge portion overlapping said projecting portions and welded thereto.

In witness whereof, I hereunto subscribe my name this 11th day of July, A. D. 1927.

ARCHIE MACPHAIL NIVEN.